US012683228B2

(12) United States Patent
Takahashi et al.

(10) Patent No.: US 12,683,228 B2
(45) Date of Patent: Jul. 14, 2026

(54) BATTERY PACK

(71) Applicant: HONDA MOTOR CO., LTD., Tokyo (JP)

(72) Inventors: Masaki Takahashi, Tokyo (JP); Shinya Nakayama, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 331 days.

(21) Appl. No.: 18/586,607

(22) Filed: Feb. 26, 2024

(65) Prior Publication Data

US 2024/0332701 A1        Oct. 3, 2024

(30) Foreign Application Priority Data

Mar. 27, 2023    (JP) ................................. 2023-049906

(51) Int. Cl.
| | |
|---|---|
| *B60L 50/64* | (2019.01) |
| *H01M 50/209* | (2021.01) |
| *H01M 50/242* | (2021.01) |
| *H01M 50/271* | (2021.01) |

(52) U.S. Cl.
CPC ........... *H01M 50/242* (2021.01); *B60L 50/64* (2019.02); *H01M 50/209* (2021.01); *H01M 50/271* (2021.01); *H01M 2220/20* (2013.01)

(58) Field of Classification Search
CPC ...................................................... B60L 50/64
See application file for complete search history.

(56) References Cited

U.S. PATENT DOCUMENTS

| | | | | | |
|---|---|---|---|---|---|
| 10,109,894 | B2 * | 10/2018 | Tsujimura | ......... | H01M 10/6562 |
| 11,211,656 | B2 * | 12/2021 | Matecki | ............. | H01M 50/271 |
| 12,456,778 | B2 * | 10/2025 | Hwang | ................ | H01M 50/211 |
| 2015/0010782 | A1 * | 1/2015 | Tanigaki | ................ | B60L 50/64 |
| | | | | | 429/7 |
| 2020/0403197 | A1 * | 12/2020 | Dawley | ............... | H01M 50/249 |
| 2022/0052410 | A1 * | 2/2022 | Schulz | ............... | H01M 50/231 |

(Continued)

FOREIGN PATENT DOCUMENTS

| | | |
|---|---|---|
| JP | 2016-058158 A | 4/2016 |
| JP | 2021-030780 A | 3/2021 |
| JP | 2021-136053 A | 9/2021 |

OTHER PUBLICATIONS

Jan. 28, 2025, Translation of Japanese Office Action issued for related JP Application No. 2023-049906.

*Primary Examiner* — Brian L Swenson
(74) *Attorney, Agent, or Firm* — Paratus Law Group, PLLC

(57)        ABSTRACT

A battery pack includes: a lower case including a bottom plate, a front wall, a rear wall, a left wall, and a right wall; and an upper cover, wherein a battery pack internal space is formed, a plurality of battery modules are an odd number and are aligned in the front-rear direction in an even number of rows in the left-right direction, at least one of the front wall and the rear wall includes: a step portion; a protruding wall portion; and a recessed wall portion, at least a part of at least one of the battery modules is disposed in a space surrounded by the protruding wall portion, the step portion, and the left wall or the right wall, and the recessed wall portion is provided with a connector that electrically connects the battery pack internal space to outside of the battery pack.

4 Claims, 7 Drawing Sheets

(56) References Cited

U.S. PATENT DOCUMENTS

| | | | |
|---|---|---|---|
| 2022/0344764 A1* | 10/2022 | Hwang | H01M 50/211 |
| 2023/0291059 A1* | 9/2023 | Lee | H01M 50/367 |
| 2023/0327257 A1* | 10/2023 | Ishitobi | B60L 50/66 |
| | | | 429/120 |
| 2024/0154208 A1* | 5/2024 | Miyake | H01M 50/24 |
| 2024/0405337 A1* | 12/2024 | Tatsuwaki | H01M 50/249 |

* cited by examiner

BATTERY PACK

CROSS-REFERENCE TO RELATED APPLICATIONS

This application is based on and claims priority under 35 USC 119 from Japanese Patent Application No. 2023-049906 filed on Mar. 27, 2023, the entire content of which is incorporated herein by reference.

TECHNICAL FIELD

The present invention relates to a battery pack mounted on a vehicle or the like.

BACKGROUND ART

In recent years, researches and developments have been conducted on a secondary battery which contributes to improvement in energy efficiency in order to allow more people to have access to affordable, reliable, sustainable and advanced energy. Especially, with regard to vehicles, due to increasing awareness of global environment protection in recent years, electrification of drive sources such as hybrid vehicles and electric automobiles is rapidly progressing.

A secondary battery mounted on an electric vehicle such as a hybrid vehicle or an electric automobile is required to be a secondary battery having a higher capacity and a higher output.

JP2021-030780A discloses a vehicle in which a battery pack including a plurality of battery modules is disposed below a passenger compartment. In the vehicle disclosed in JP2021-030780A, a quick charging port and a normal charging port are provided in a rear portion of the vehicle, and a connector to which a quick charging harness electrically connecting the quick charging port to the battery pack is connected and a connector to which a normal charging harness electrically connecting the normal charging port to the battery pack via a charger is connected are provided at a rear portion of the battery pack.

In the vehicle disclosed in JP2021-030780A, high-voltage large-current electric power flows through the quick charging harness and the normal charging harness. Therefore, in the battery pack mounted on the vehicle disclosed in JP2021-030780A, in order to protect the two connectors, a rear side connection portion is formed by recessing a part of a platform-like portion of an upper cover, and the two connectors are disposed at the rear side connection portion.

SUMMARY OF INVENTION

However, in the battery pack mounted on the vehicle disclosed in JP2021-030780A, it is necessary to dispose a relay or a fuse at a position protruding rightward from the battery module in order to form the rear side connection portion by recessing a part of the platform-like portion of the upper cover. Therefore, there is a problem that use efficiency of a space inside the battery pack and a space around the battery pack is reduced.

The present invention provides a battery pack that can efficiently use a space inside the battery pack and a space around the battery pack while protecting a connector.

According to the present invention, a space inside a battery pack and a space around the battery pack can be efficiently used while protecting a connector.

DESCRIPTION OF EMBODIMENTS

Figure 1:
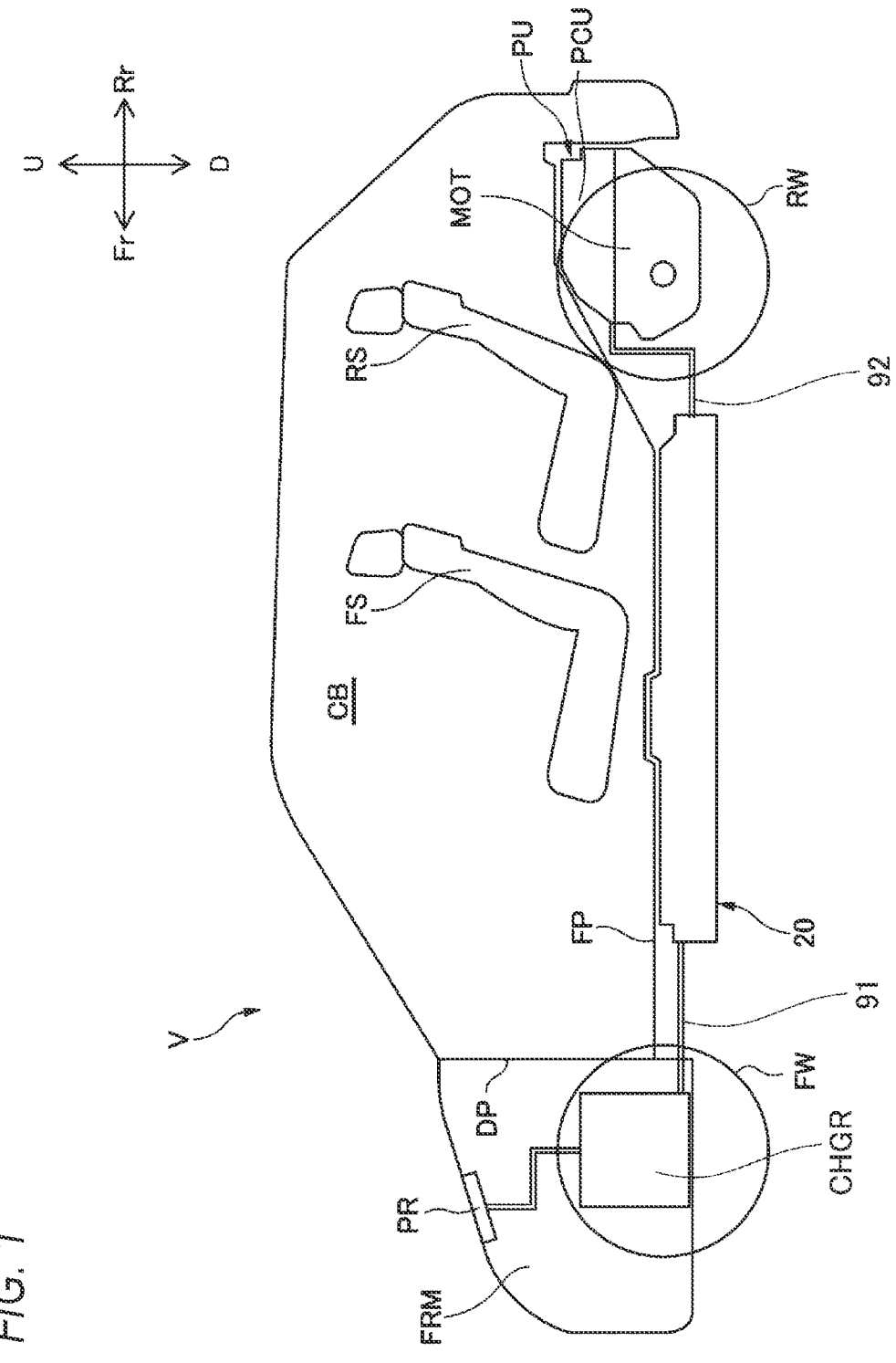
FIG. 1 is a schematic side view of a vehicle on which a battery pack according to an embodiment of the present invention is mounted.

Hereinafter, an embodiment of a vehicle on which a battery pack according to the present invention is mounted will be described with reference to the accompanying drawings. The drawings are viewed in directions of reference numerals. In the present specification and the like, in order to simplify and clarify the description, a front-rear direction, a left-right direction, and an upper-lower direction are described according to directions viewed from a driver of the vehicle, and in the drawings, a front side of the vehicle is shown as Fr, a rear side is shown as Rr, a left side is shown as L, a right side is shown as R, an upper side is shown as U, and a lower side is shown as D.

[Overall Configuration of Vehicle]

As shown in FIG. 1, a vehicle V according to the present embodiment includes a pair of left and right front wheels FW, a pair of left and right rear wheels RW, and a floor panel FP constituting a floor of the vehicle V. The vehicle V is partitioned, by a dash panel DP extending in the upper-lower direction above the floor panel FP, into a passenger compartment CB and a front room FRM in front of the passenger compartment CB. A front seat FS and a rear seat RS are provided in the passenger compartment CB.

A battery pack 20 is disposed below the floor panel FP. The battery pack 20 is disposed below the floor panel FP and below a floor of the passenger compartment CB.

The vehicle V includes a power unit PU, a charge and power supply control device CHGR that controls input and output electric power of the battery pack 20, and a power transmission mechanism (not shown) that transmits power of the power unit PU to the pair of left and right front wheels FW and/or the pair of left and right rear wheels RW. The power unit PU is disposed behind the rear seat RS and below the floor panel FP. The charge and power supply control device CHGR is disposed in the front room FRM.

The vehicle V includes a power-receiving unit PR that can receive electric power from an external power supply. In the present embodiment, the power-receiving unit PR is provided on an upper surface of the front room FRM and is electrically connected to the charge and power supply control device CHGR.

The charge and power supply control device CHGR is an electric power device that includes an inverter and a DC-DC converter and controls charge and power supply of the battery pack 20. The charge and power supply control device CHGR receives, via the power-receiving unit PR, AC electric power for general household use from the external power supply. The charge and power supply control device CHGR is a power converter that can convert the AC electric power received from the power-receiving unit PR into DC electric power, raise or lower the DC electric power to a predetermined voltage, supply the DC electric power to the battery pack 20, raise or lower DC electric power charged in the battery pack 20 to a predetermined voltage, convert the DC electric power into AC electric power, and supply the AC electric power from a power supply unit (not shown) to a household power supply, an electric device, or the like.

The power unit PU includes a drive motor MOT that is a power source of the vehicle V, and a control device PCU that controls the drive motor MOT. The power unit PU supplies electric power stored in the battery pack 20 to the drive motor MOT via the control device PCU, and thus the drive motor MOT is operated to generate a driving force for driving the vehicle V.

Figure 2:
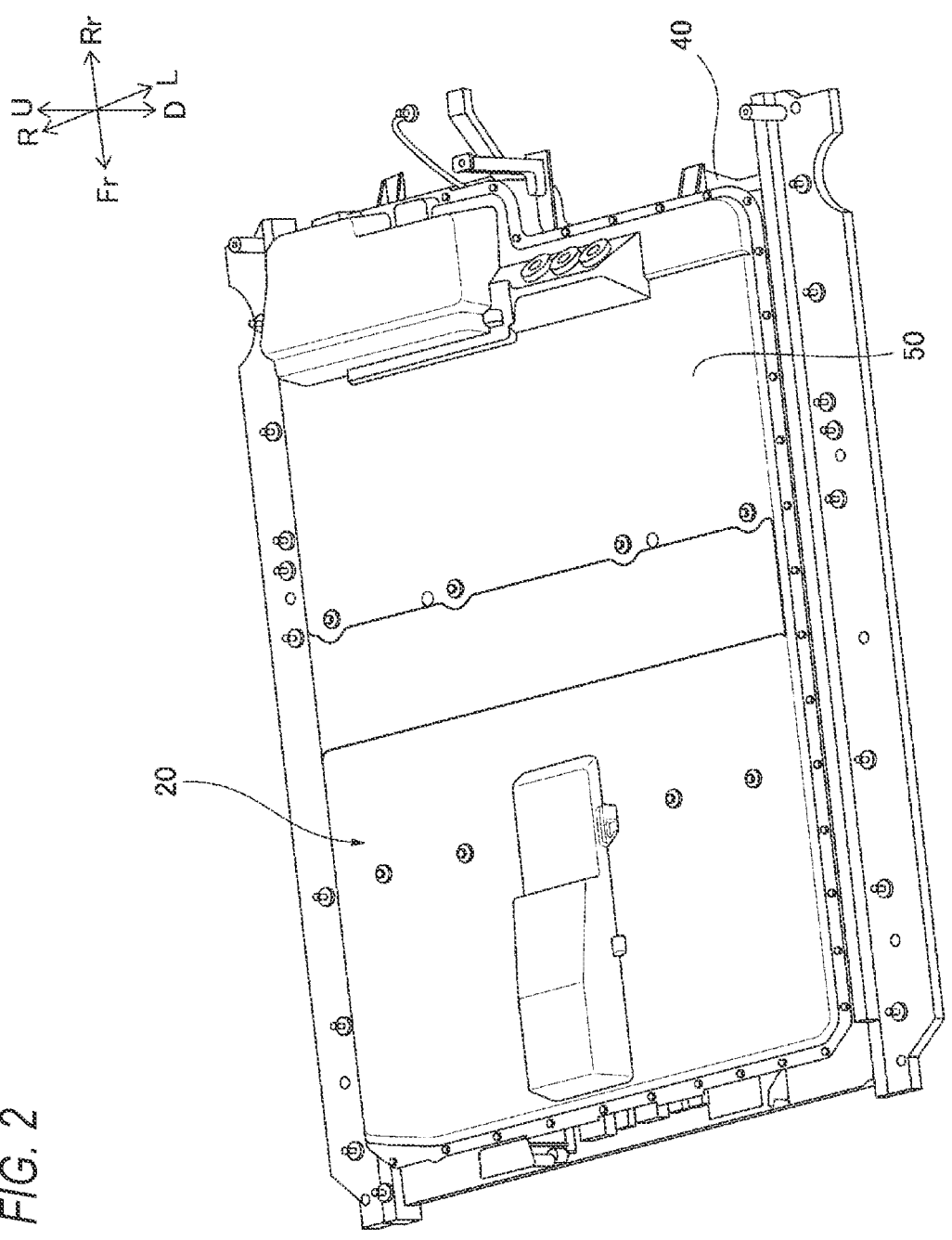
FIG. 2 is a perspective view of the battery pack according to the embodiment of the present invention when viewed obliquely from above.

As shown in FIG. 2, the battery pack 20 includes a lower case 40 whose upper portion is opened and an upper cover 50 that covers the upper portion of the lower case 40. A battery pack internal space 60 surrounded by the lower case 40 and the upper cover 50 is formed in the battery pack 20.

Figure 3:
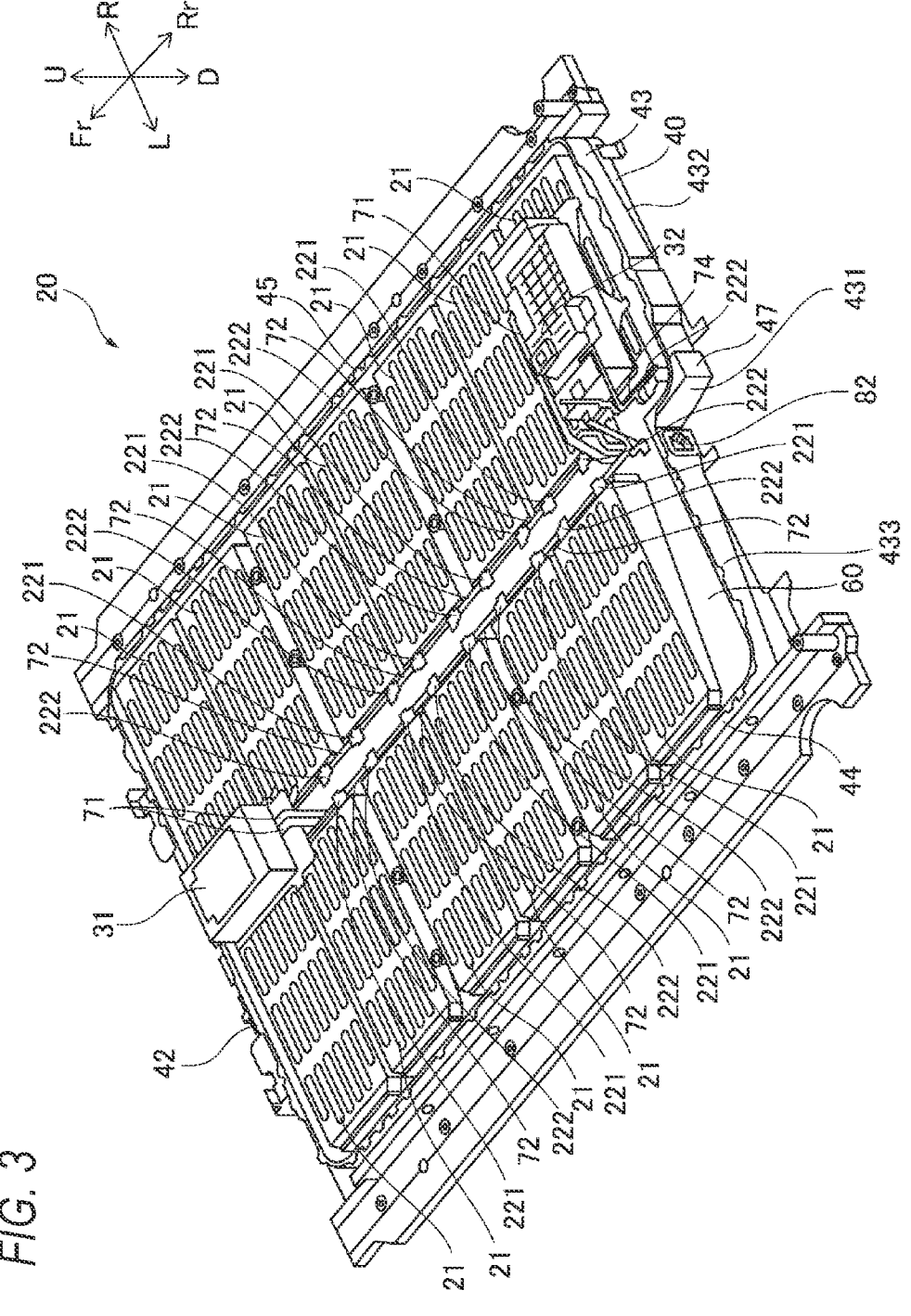
FIG. 3 is a perspective view of the battery pack in FIG. 2 when viewed obliquely from above in a state in which an upper cover is removed.
Figure 4:
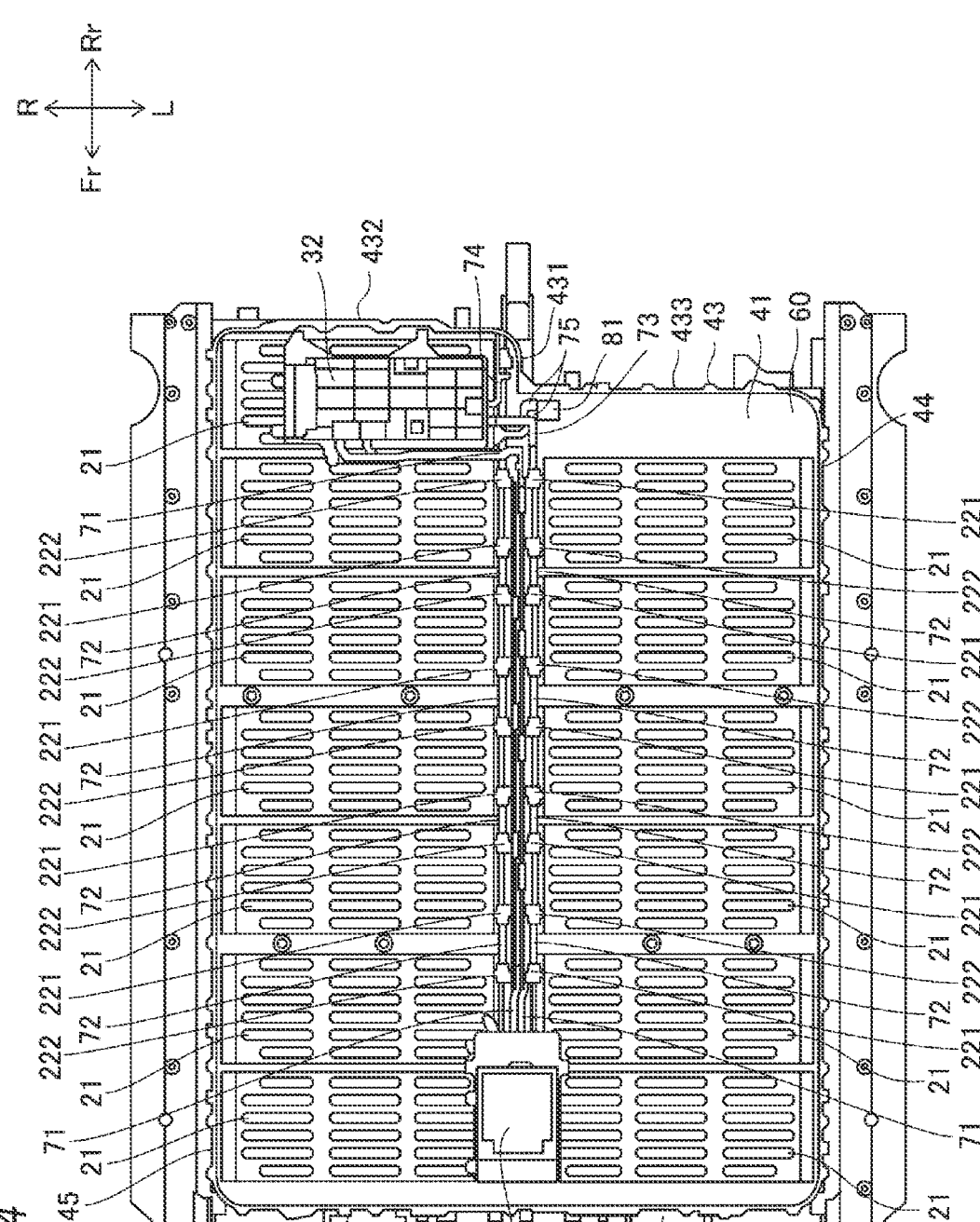
FIG. 4 is a top view of the battery pack in FIG. 2 when viewed from above in a state in which the upper cover is removed.
Figure 5:
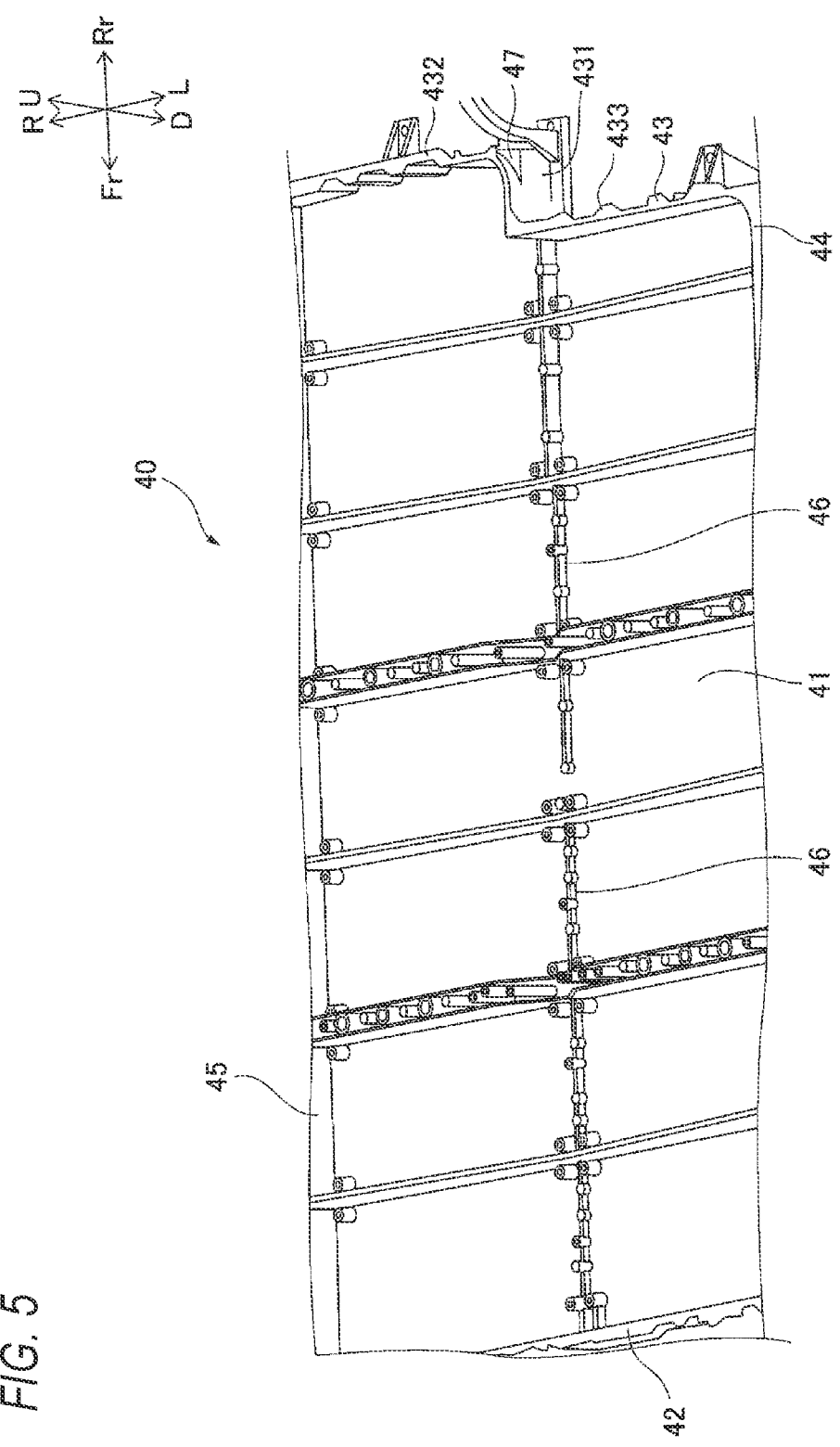
FIG. 5 is a perspective view of a lower case of the battery pack in FIG. 2 when viewed obliquely from above.

As shown in FIGS. 3 to 5, the battery pack 20 accommodates a plurality of battery modules 21, a first junction board 31, and a second junction board 32. The plurality of battery modules 21, the first junction board 31, and the second junction board 32 are accommodated in the battery pack internal space 60.

The lower case 40 includes a bottom plate 41 that covers lower portions of the plurality of battery modules 21, a front wall 42 that stands upward and extends in the left-right direction at a front portion of the bottom plate 41, a rear wall 43 that stands upward and extends in the left-right direction at a rear portion of the bottom plate 41, a left wall 44 that stands upward and extends in the front-rear direction at a left portion of the bottom plate 41, and a right wall 45 that stands upward and extends in the front-rear direction at a right portion of the bottom plate 41. The battery pack internal space 60 is a space surrounded by the bottom plate 41, the front wall 42, the rear wall 43, the left wall 44, and the right wall 45.

The rear wall 43 includes a step portion 431 that extends in the front-rear direction at a substantially central portion in the left-right direction when viewed in the upper-lower direction, a protruding wall portion 432 that is bent from a rear end of the step portion 431 and extends rightward, and a recessed wall portion 433 that is bent from a front end of the step portion 431 and extends leftward. Therefore, the battery pack internal space 60 is a space whose right area protrudes rearward when viewed in the upper-lower direction.

The battery module 21 has a substantially rectangular parallelepiped shape. In the battery module 21, a plurality of battery cells are stacked. The plurality of battery cells of the battery module 21 are electrically connected by a bus bar plate (not shown) or the like. A plus terminal 221 and a minus terminal 222, which are input and output terminals for transmitting and receiving electric power between the battery module 21 and an external electric device, are provided at an upper portion of the battery module 21 (see FIGS. 3-4, 6, and 7). In the present embodiment, the plus terminal 221 and the minus terminal 222 are aligned in a short-side direction at the upper portion of the battery module 21 on one end on one side in a longitudinal direction when viewed in the upper-lower direction.

The battery module 21 is disposed in the battery pack internal space 60 such that the longitudinal direction extends in a vehicle width direction and the short-side direction extends in the front-rear direction when viewed in the upper-lower direction. Further, the battery module 21 is disposed in the battery pack internal space 60 such that a side where the plus terminal 221 and the minus terminal 222 are provided in the longitudinal direction is a center side in the vehicle width direction. An odd number of battery modules 21 are accommodated in the battery pack internal space 60 of the battery pack 20. In the present embodiment, thirteen battery modules 21 are accommodated in the battery pack internal space 60 of the battery pack 20.

The plurality of battery modules 21 are aligned in the front-rear direction in two rows in the left-right direction in the battery pack internal space 60. In the present embodiment, seven battery modules 21 are aligned in the front-rear direction in a right row, and six battery modules 21 are aligned in the front-rear direction in a left row.

In the battery pack internal space 60, when viewed in the upper-lower direction, at least a part of the battery module 21 disposed rearmost in the right row is disposed in a space surrounded by the protruding wall portion 432, the step portion 431, and the right wall 45. That is, in the battery pack internal space 60, when viewed in the upper-lower direction, at least a part of the battery module 21 disposed rearmost in the right row is disposed in a space protruding rearward in the right area.

In the battery pack internal space 60, a collision-receiving structure 46 is provided at a substantially central portion in the left-right direction, which extends in the front-rear direction between the battery modules 21 aligned in the two rows in the left-right direction. In the present embodiment, the collision-receiving structure 46 is a rib protruding upward from the bottom plate 41. The collision-receiving structure 46 extends, from the front wall 42 to the rear wall 43, in the front-rear direction over substantially an entire area of the lower case 40 in the front-rear direction. The collision-receiving structure 46 does not necessarily extend continuously from the front wall 42 to the rear wall 43, and may extend in the front-rear direction from the front wall 42 to the rear wall 43 with a part thereof being interrupted.

The collision-receiving structure 46 overlaps the step portion 431 at the rear wall 43 when viewed in the upper-lower direction.

The first junction board 31 is accommodated in the battery pack internal space 60 and is disposed in the vicinity of a front end of the battery pack 20. More specifically, in the battery pack internal space 60, the first junction board 31 is disposed above the battery modules 21 aligned foremost in the left-right direction to straddle the battery modules 21 aligned foremost in the left-right direction.

The second junction board 32 is accommodated in the battery pack internal space 60 and is disposed in the vicinity of a rear end of the battery pack 20. More specifically, in the battery pack internal space 60, the second junction board 32 is disposed above the battery module 21 disposed rearmost in the right row, that is, the battery module 21 disposed in at least a part of the space protruding rearward in the right area of the battery pack internal space 60.

Further, a high-voltage electric power line 71 that connects the first junction board 31 to the second junction board 32 is routed in the battery pack internal space 60.

The first junction board 31 is electrically connected to the charge and power supply control device CHGR. The first junction board 31 and the charge and power supply control device CHGR are electrically connected by an electric power cable 91 (see FIG. 1). Electric power received by the power-receiving unit PR from the outside of the vehicle V is supplied from the charge and power supply control device CHGR to the first junction board 31. The first junction board 31 is also electrically connected to an air conditioner (not shown) or the like that is mounted on the vehicle V and performs air conditioning in the passenger compartment CB. The first junction board 31 can output electric power stored in each battery module 21 to the charge and power supply control device CHGR, the air conditioner (not shown), and the like.

The first junction board 31 includes a circuit breaker such as a fuse. When abnormal electric power is supplied to the first junction board 31, the supply of electric power is interrupted by the circuit breaker such as a fuse to protect the battery module 21, the second junction board 32, the charge and power supply control device CHGR, the power unit PU, the air conditioner (not shown), and the like.

The second junction board 32 is electrically connected to the first junction board 31 by the high-voltage electric power line 71. The second junction board 32 is also electrically connected to the battery module 21.

The second junction board 32 includes a switching element and controls input and output of electric power to and from the battery module 21 by opening and closing control of the switching element.

The battery pack 20 includes a plurality of bus bars 72 that electrically connect the minus terminals 222 of the battery modules 21 to the plus terminals 221 of the battery modules 21 adjacent in the front-rear direction. The battery pack 20 further includes a bus bar (not shown) that electrically connects the minus terminal 222 of one of the left and right battery modules 21 disposed foremost to the plus terminal 221 of the other of the left and right battery modules 21 disposed foremost. In this way, in the present embodiment, the thirteen battery modules 21 are connected in series.

The battery pack 20 further includes, in the battery pack internal space 60, a plus-side bus bar 73 that electrically connects the second junction board 32 to the plus terminal 221 of the battery module 21 disposed rearmost in the left row, and a minus-side bus bar 74 that electrically connects the second junction board 32 to the minus terminal 222 of the battery module 21 disposed rearmost in the right row.

In this way, the second junction board 32 is electrically connected to the thirteen battery modules 21 connected in series.

As described above, the battery modules 21 are disposed in the battery pack internal space 60 such that the side where the plus terminal 221 and the minus terminal 222 are provided in the longitudinal direction is the center side in the vehicle width direction, and thus each bus bar 72, which electrically connects the battery modules 21 adjacent in the front-rear direction, is located between battery modules aligned in the left-right direction and extends in the front-rear direction.

The high-voltage electric power line 71 is routed in the front-rear direction between the battery modules aligned in the left-right direction. In the present embodiment, the high-voltage electric power line 71 is routed in the front-rear direction between the battery modules aligned in the left-right direction below each bus bar that 72 electrically connects the battery modules 21 adjacent in the front-rear direction.

Therefore, since the high-voltage electric power line 71 is routed in the front-rear direction between the battery modules 21 aligned in the left-right direction where the collision-receiving structure 46 is provided in the battery pack internal space 60, the high-voltage electric power line 71 connecting the charge and power supply control device CHGR to the drive motor MOT can be protected, and collision safety of the vehicle Vis improved.

Figure 6:
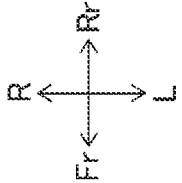
FIG. 6 is an enlarged view of the vicinity of a step portion in FIG. 4.
Figure 6:
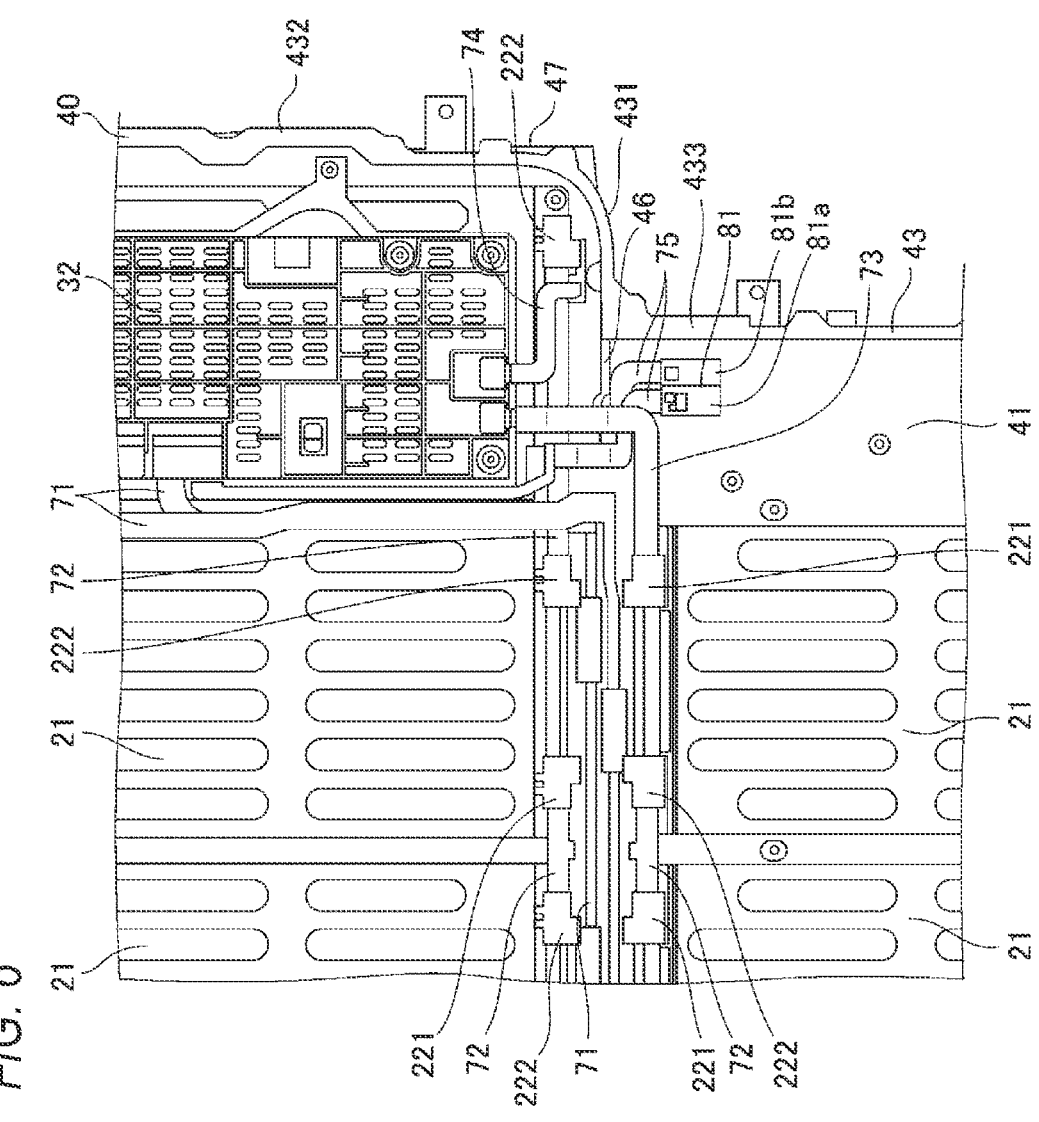
Figure 7:
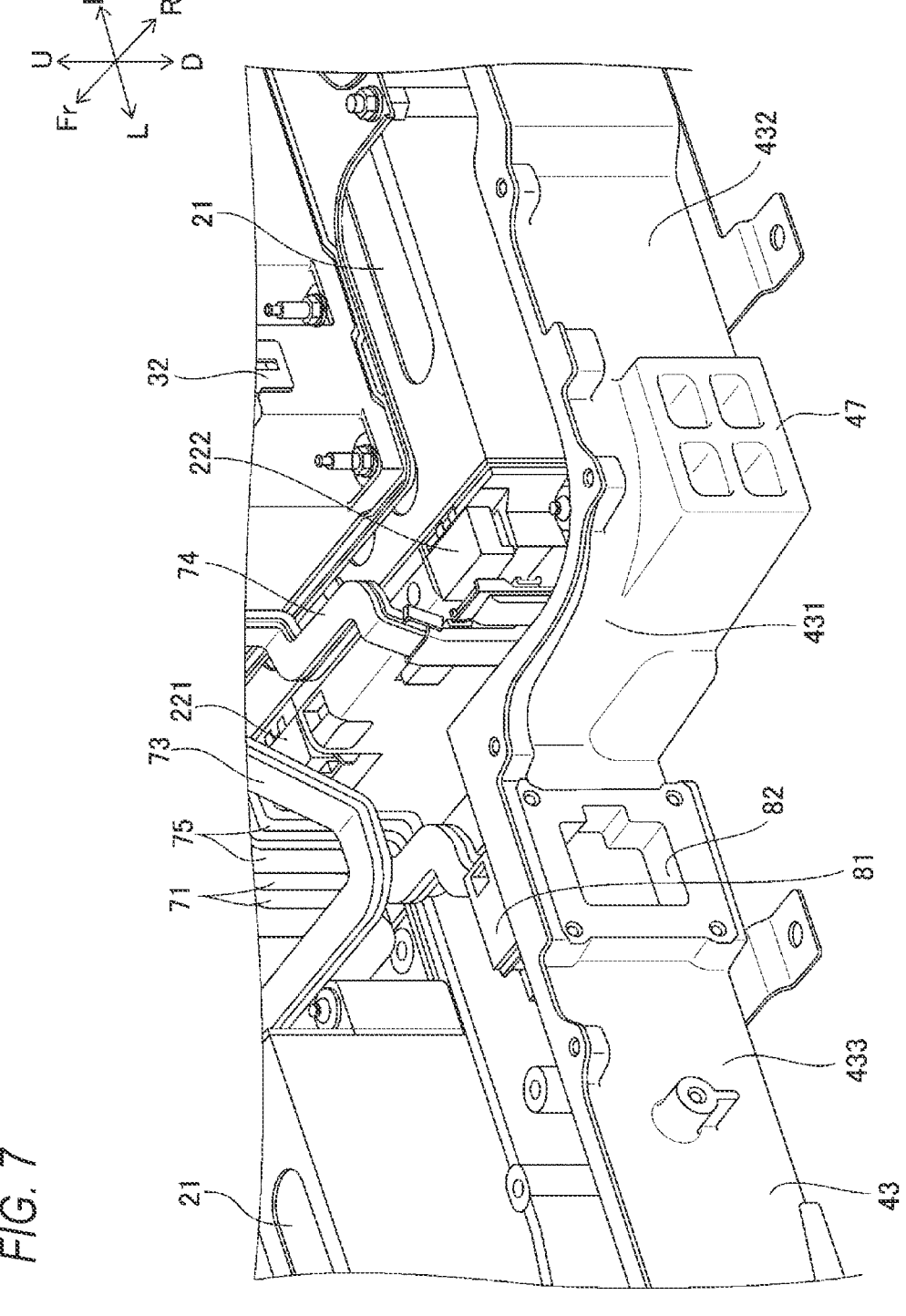
FIG. 7 is a perspective view of the vicinity of a connector of the battery pack in FIG. 2 when viewed obliquely from above in a state in which the upper cover is removed.

As shown in FIGS. 6 and 7, in the battery pack internal space 60, an output terminal 81 is provided on a left side of the second junction board 32 in an area behind the battery module 21 disposed rearmost in the left column. The output terminal 81 includes a plus terminal 81a and a minus terminal 81b. Further, an output bus bar 75 that electrically connects the second junction board 32 to the output terminal 81 is provided in the battery pack internal space 60. Two output bus bars 75 are provided, one electrically connecting the second junction board 32 to the plus terminal 81a of the output terminal 81 and the other electrically connecting the second junction board 32 to the minus terminal 81b of the output terminal 81.

The recessed wall portion 433 formed at the rear wall 43 of the lower case 40 is provided with a connector 82 that electrically connects the battery pack internal space 60 to the outside of the battery pack 20. The connector 82 is provided behind the output terminal 81 provided in the battery pack internal space 60.

A connector plug of an electric power cable 92 (see FIG. 1) connected to the power unit PU is fitted into the connector 82, and the output terminal 81 provided in the battery pack internal space 60 is electrically connected to the electric power cable 92.

Therefore, the high-voltage electric power line 71 connects the charge and power supply control device CHGR to the drive motor MOT of the power unit PU via the first junction board 31 and the second junction board 32.

Since the connector 82 that electrically connects the battery pack internal space 60 to the outside of the battery pack 20 is provided at the recessed wall portion 433, the protruding wall portion 432 can be used as a protection structure of the connector 82.

Further, in the battery pack internal space 60, by disposing at least a part of at least one battery module 21 in the space surrounded by the protruding wall portion 432, the step portion 431, and the right wall 45 when viewed in the upper-lower direction, the battery pack 20 can be disposed without reducing space efficiency of the battery pack internal space 60, and the protruding wall portion 432 can be used as the protection structure of the connector 82 such that a space inside the battery pack 20 and a space around the battery pack 20 can be efficiently used while protecting the connector 82.

As described above, the collision-receiving structure 46 overlaps the step portion 431 when viewed in the upper-lower direction. Thus, the collision-receiving structure 46 extends to a position behind the connector 82 in the front-rear direction. Therefore, the step portion 431 also functions as a portion of the collision-receiving structure 46. Accordingly, the connector 82 can be more reliably protected.

Further, a collision-receiving portion 47 protruding rearward from the protruding wall portion 432 is formed in the vicinity of a connection portion of the protruding wall portion 432 with the step portion 431. The collision-receiving portion 47 is provided at a position at least partially overlapping the collision-receiving structure 46 when viewed in the front-rear direction.

Accordingly, a load is input to the collision-receiving portion 47 prior to the protruding wall portion 432 due to the collision-receiving portion 47 formed at the protruding wall portion 432, and further, the load input to the collision-receiving portion 47 is transmitted to the collision-receiving structure 46, thus the protruding wall portion 432 can be prevented from deforming, and the connector 82 can be more reliably protected.

Although an embodiment of the present invention has been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, respective constituent elements in the above embodiment may be freely combined without departing from the gist of the invention.

For example, in the present embodiment, the plurality of battery modules 21 are aligned in the front-rear direction in the two rows in the left-right direction in the battery pack internal space 60, and may alternatively be aligned in the front-rear direction in any even number of two or more rows in the left-right direction.

For example, in the present embodiment, thirteen battery modules 21 are accommodated in the battery pack internal space 60 of the battery pack 20, and alternatively, any odd number other than thirteen of battery modules 21 may be accommodated.

For example, in the present embodiment, the protruding wall portion 432 is bent from the rear end of the step portion 431 and extends rightward, the recessed wall portion 433 is bent from the front end of the step portion 431 and extends leftward, and alternatively, the protruding wall portion 432 may bend from the rear end of the step portion 431 and extend leftward, and the recessed wall portion 433 may bend from the front end of the step portion 431 and extend rightward. In this case, the battery modules 21 are aligned in the front-rear direction in two left and right rows such that the number of left rows is larger by one than the number of right rows, and at least a part of the battery module 21 disposed rearmost in the left row is disposed in a space surrounded by the protruding wall portion 432, the step portion 431, and the left wall 44 when viewed in the upper-lower direction in the battery pack internal space 60. That is, in the battery pack internal space 60, at least a part of the battery module 21 disposed rearmost in the left row is disposed in a space protruding rearward in a left area when viewed in the upper-lower direction.

For example, in the present embodiment, the step portion 431, the protruding wall portion 432, and the recessed wall portion 433 are formed at the rear wall 43, the connector 82 is provided at the rear wall 43, and alternatively, the step portion 431, the protruding wall portion 432, and the recessed wall portion 433 may be formed at the front wall 42, and the connector 82 may be provided at the front wall 42.

For example, in the present embodiment, the high-voltage electric power line 71 electrically connects the charge and power supply control device CHGR mounted in the front room FRM to the drive motor MOT of the power unit PU mounted behind the rear seat RS, and alternatively, the high-voltage electric power line 71 may electrically connect an electric power device other than the charge and power supply control device CHGR mounted in the front room FRM to the drive motor MOT of the power unit PU mounted behind the rear seat RS. For example, the control device PCU that controls the drive motor MOT may be mounted in the front room FRM, and the high-voltage electric power line 71 may electrically connect the control device PCU to the drive motor MOT mounted behind the rear seat RS.

In this specification, at least the following matters are described. In parentheses, the corresponding constituent elements and the like in the above embodiment are shown as an example, but the present invention is not limited thereto.

(1) A battery pack (battery pack 20) that accommodates a plurality of battery modules (battery module 21) in which a plurality of battery cells are stacked, the battery pack including:

an a lower case (lower case 40) whose upper portion is opened, the lower case including a bottom plate (bottom plate 41) that covers lower portions of the plurality of battery modules, a front wall (front wall 42) that stands upward and extends in a left-right direction at a front portion of the bottom plate, a rear wall (rear wall 43) that stands upward and extends in the left-right direction at a rear portion of the bottom plate, a left wall (left wall 44) that stands upward and extends in a front-rear direction at a left portion of the bottom plate, and a right wall (right wall 45) that stands upward and extends in the front-rear direction at a right portion of the bottom plate; and an upper cover (upper cover 50) that covers the upper portion of the lower case, in which a battery pack internal space (battery pack internal space 60) surrounded by the lower case and the upper cover is formed, the plurality of battery modules are an odd number of three or more of the battery modules and are aligned in the front-rear direction in an even number of rows in the left-right direction in the battery pack internal space, when viewed in an upper-lower direction, at least one of the front wall and the rear wall includes:

a step portion (step portion 431) extending in the front-rear direction;

a protruding wall portion (protruding wall portion 432) that is bent from an end of the step portion on a side far from a front-rear direction center of the battery pack and extends to one side in the left-right direction; and a recessed wall portion (recessed wall portion 433) that is bent from an end of the step portion on a side close to the front-rear direction center of the battery pack and extends to the other side in the left-right direction, when viewed in the upper-lower direction, in the battery pack internal space, at least a part of at least one of the battery modules is disposed in a space surrounded by the protruding wall portion, the step portion, and the left wall or the right wall, and the recessed wall portion is provided with a connector (connector 82) that electrically connects the battery pack internal space to outside of the battery pack.

According to (1), in the battery pack internal space, by disposing at least a part of at least one battery module in the space surrounded by the protruding wall portion, the step portion, and the left wall or the right wall when viewed in the upper-lower direction, the battery module can be disposed without reducing space efficiency of the battery pack internal space, and the protruding wall portion can be used as a protection structure of the connector such that a space inside the battery pack and a space around the battery pack can be efficiently used while protecting the connector.

(2) The battery pack according to (1), in which the plurality of battery modules are aligned in the front-rear direction in two rows in the left-right direction in the battery pack internal space, the battery pack internal space is provided with a collision-receiving structure (collision-receiving structure 46) that extends in the front-rear direction between the battery modules aligned in the left-right direction, and the collision-receiving structure extends in the front-rear direction to a position farther from the front-rear direction center of the battery pack than the connector and overlaps the step portion when viewed in the upper-lower direction.

According to (2), since the collision-receiving structure extends in the front-rear direction to the position farther from the front-rear direction center of the battery pack than the connector and overlaps the step portion when viewed in the upper-lower direction, the step portion also functions as a part of the collision-receiving structure. Accordingly, the connector can be more reliably protected.

(3) The battery pack according to (2), in which the protruding wall portion is formed with a collision-receiving portion (collision-receiving portion 47) that protrudes in a direction far from the front-rear direction center of the battery pack in the front-rear direction, and the collision-receiving portion is provided at a position where at least a part thereof overlaps the collision-receiving structure when viewed in the front-rear direction.

According to (3), a load is input to the collision-receiving portion prior to the protruding wall portion due to the collision-receiving portion formed at the protruding wall portion, and further, the load input to the collision-receiving portion is transmitted to the collision-receiving structure, thus the protruding wall portion can be prevented from deforming, and the connector can be more reliably protected.

(4) The battery pack according to (2) or (3), in which the battery pack is mounted on a vehicle (vehicle V) including a drive motor (drive motor MOT) operable with electric power stored in the battery pack, and an electric power device (charge and power supply control device CHGR) configured to control input and output electric power of the battery pack, an electric power line (high-voltage electric power line 71) that connects the electric power device to the drive motor is routed in the battery pack internal space, and the electric power line is routed in the front-rear direction between the battery modules aligned in the left-right direction in the battery pack internal space.

According to (4), since the electric power line that connects the power control device to the drive motor is routed in the battery pack internal space and the electric power line is routed in the front-rear direction between the battery modules aligned in the left-right direction where the collision-receiving structure is provided in the battery pack internal space, the electric power line connecting the power control device to the drive motor can be protected, and collision safety of the vehicle is improved.

What is claimed is:

1. A battery pack that accommodates a plurality of battery modules in which a plurality of battery cells are stacked, the battery pack comprising:

a lower case whose upper portion is opened, the lower case including a bottom plate that covers lower portions of the plurality of battery modules, a front wall that stands upward and extends in a left-right direction at a front portion of the bottom plate, a rear wall that stands upward and extends in the left-right direction at a rear portion of the bottom plate, a left wall that stands upward and extends in a front-rear direction at a left portion of the bottom plate, and a right wall that stands upward and extends in the front-rear direction at a right portion of the bottom plate; and an upper cover that covers the upper portion of the lower case, wherein a battery pack internal space surrounded by the lower case and the upper cover is formed, the plurality of battery modules are an odd number of three or more of the battery modules and are aligned in the front-rear direction in an even number of rows in the left-right direction in the battery pack internal space, when viewed in an upper-lower direction, at least one of the front wall and the rear wall includes:

a step portion extending in the front-rear direction;

a protruding wall portion that is bent from an end of the step portion on a side far from a front-rear direction center of the battery pack and extends to one side in the left-right direction; and a recessed wall portion that is bent from an end of the step portion on a side close to the front-rear direction center of the battery pack and extends to the other side in the left-right direction, when viewed in the upper-lower direction, in the battery pack internal space, at least a part of at least one of the battery modules is disposed in a space surrounded by the protruding wall portion, the step portion, and the left wall or the right wall, and the recessed wall portion is provided with a connector that electrically connects the battery pack internal space to outside of the battery pack.

2. The battery pack according to claim 1, wherein the plurality of battery modules are aligned in the front-rear direction in two rows in the left-right direction in the battery pack internal space, the battery pack internal space is provided with a collision-receiving structure that extends in the front-rear direction between the battery modules aligned in the left-right direction, and the collision-receiving structure extends in the front-rear direction to a position farther from the front-rear direction center of the battery pack than the connector and overlaps the step portion when viewed in the upper-lower direction.

3. The battery pack according to claim 2, wherein the protruding wall portion is formed with a collision-receiving portion that protrudes in a direction far from the front-rear direction center of the battery pack in the front-rear direction, and

the collision-receiving portion is provided at a position where at least a part thereof overlaps the collision-receiving structure when viewed in the front-rear direction.

4. The battery pack according to claim 2, wherein the battery pack is mounted on a vehicle including
a drive motor operable with electric power stored in the battery pack, and
an electric power device configured to control input and output electric power of the battery pack,
an electric power line that connects the electric power device to the drive motor is routed in the battery pack internal space, and
the electric power line is routed in the front-rear direction between the battery modules aligned in the left-right direction in the battery pack internal space.

\* \* \* \* \*